March 17, 1970 F. P. RUSSO ET AL 3,501,005
HYDRAULIC FILTER CARTRIDGE WITH INDICATOR
Filed May 19, 1969
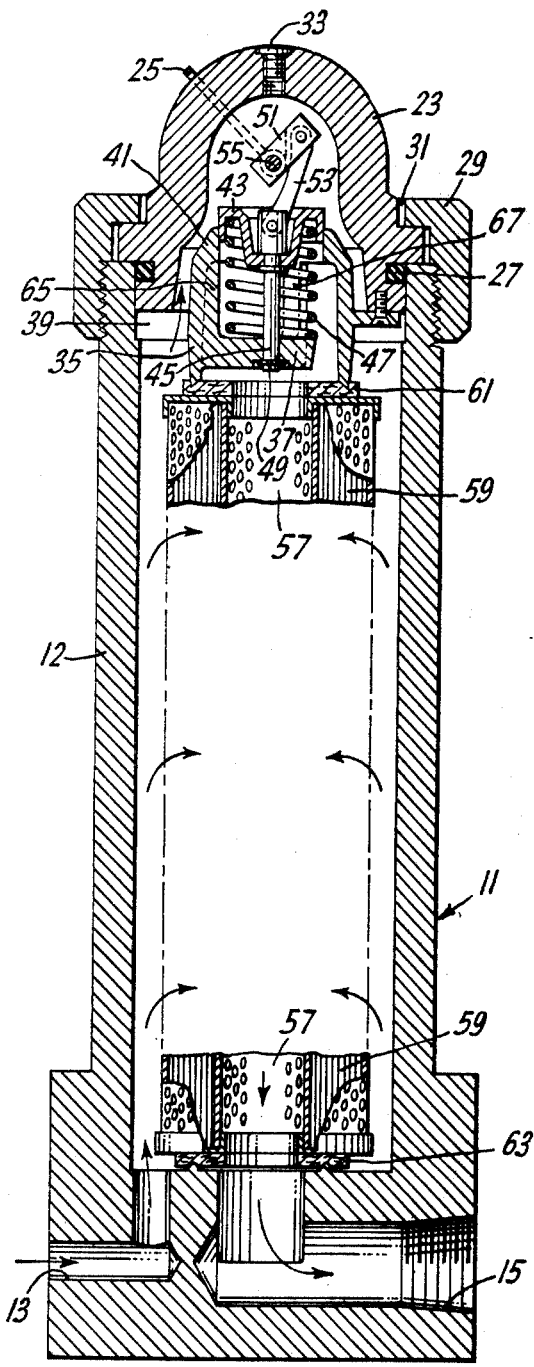
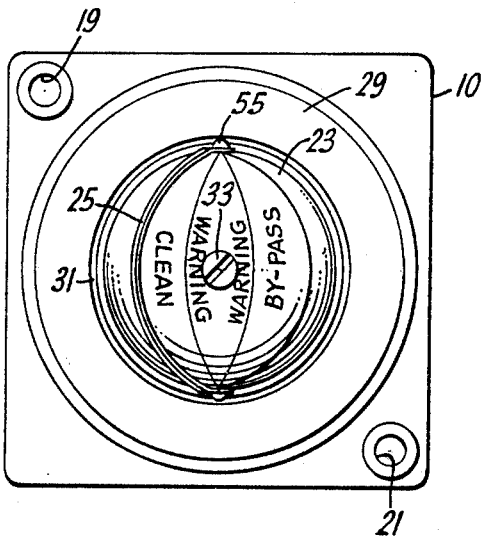
INVENTORS
FRANCIS PAUL RUSSO
THOMAS WILLIAM SPARGO
BY
ATTORNEY 3,501,005
HYDRAULIC FILTER CARTRIDGE WITH INDICATOR
Francis Paul Russo, Waterbury, and Thomas William Spargo, Cheshire, Conn., assignors to American Machine & Foundry Company, a corporation of New Jersey
Filed May 19, 1969, Ser. No. 825,833
Int. Cl. B01d 35/14, 27/10, 41/00
U.S. Cl. 210—90                    6 Claims

ABSTRACT OF THE DISCLOSURE

A hydraulic filter cartridge having a one piece base and sump and a cover. The cover supports a pressure responsive by-pass means and indicating means responsive to the by-pass means.

---

This invention relates to filter cartridges. More particularly the invention relates to filter cartridges useful in hydraulic fluid systems where the cartridge is to be inserted in a pressure line.

Although hydraulic filter cartridges are known, many of them present certain disadvantages. For example, many are constructed in such a manner that in order to change or insert a new filter element when the cartridge becomes plugged or dirty, it is necessary to disassemble the system. Moreover, many of the known cartridges do not include any means of indicating when the system is becoming contaminated or dirty thereby affecting the efficiency of flow and consequent build-up in pressures. The present invention overcomes these disadvantages and permits changing of the filter element simply by removing the top of the unit, removing the element and replacing it with a new element. Furthermore, since the unit may be opened with relative facility, filter elements having various filtering rates or capacities can be easily disposed for use in the unit. In addition, the present invention provides a hydraulic filter cartridge which has a readily visible indicating system on top of the unit and which permits easy visual inspection from any angle and pinpoints the condition of the filter element contained in the unit. The filter cartridge of this invention also is advantageous in that it is made of a unitary base and sump which can be impact extruded in one piece.

In order to understand the invention more completely reference is made to the attached drawing wherein:

FIGURE 1 is an elevational view in section of a filter cartridge in accordance with the invention and illustrating in partial detail a suitable filter element employed therewith; and FIGURE 2 is a plan view of a filter cartridge according to the invention illustrating the indicating means and bar indicator on the external surface of the cover.

Referring more particularly to FIGURE 1, a filter cartridge of this invention comprises a unitary base and sump generally referred to by numeral 11, the base being designated particularly by numeral 10 and the sump by numeral 12. The base 10 is provided with an inlet 13 which communicates with the peripheral portion of the sump 12 and an outlet 15 which communicates with the central portion of the sump.

Disposed around the internal extremity of the outlet is a sealing rib 17, the purposes of which are set forth in greater detail hereinafter. In addition, the base 10 may be provided with mounting holes 19 and 21 as illustrated in FIGURE 2 so that the cartridge can be secured to a support if desirable. At the end opposite the base 10 the sump 12 is provided with a cover 23 which is hemispherical in shape and which is utilized as an indicator face, the external surface of said cover being properly marked as illustrated in FIGURE 2 with areas to indicate when the filter is operating in a clean condition and when it is approaching a dirty condition by a warning zone and finally when it is operating in a by-pass condition in a by-pass zone.

Each of these zones are illustrated in FIGURE 2 are easily visible due to the hemispherical shape of the cover and the exact internal condition of the cartridge is clearly indicated by the position of a semi-circumferential band 25 which sweeps across the zones in response to pressure differentials within the cartridge as explained more fully hereinafter.

The hemispherical cover 23 is shaped so that it is supported on the upper end of the sump 12 and is fitted with a sealing gasket 27 in order to insure against leakage and pressure losses. The hemispherical cover is fixed to the sump 12 by a threaded locking nut 29 which has a central opening 31 through which the cover projects when the nut is in place. In addition, the cover is equipped with a vent valve 33 which can be adapted to open automatically as pressure exceeds a specific amount and permit gases or fluid to escape.

Removably attached to the bottom of the hemispherical cover is a support means equipped with a centrally projecting base 37 near its lower end. The support means is generally circular and contains a plurality of openings 39 cut into a ring-like structure which is disposed around the internal central body portion of the support means. The central body portion of the support means designated by 41 forms a cylinder in which there is disposed a movable piston 43 fixed to a rod 45 and mounted on a spring 47 which is disposed around the rod. The spring is properly calibrated so that due to changes in differential pressure it will permit the piston and rod to move downwardly in the central body portion of support means 35.

Spring 47 is supported at its lower end on base 37 of the support means 35 and rod 45 passes through a central opening in base 37 so that it can move downwardly along with the piston when differential pressure is sufficient to overcome the force of the spring. The upward movement of the rod is limited by a lock washer or other suitable means 49 attached to the rod on the lower side of base 37. At its opposite end rod 45 is connected to a suitable linkage made up of elements 51 and 53 which in turn are attached to a rod 55 which extends through openings (not shown) through the hemispherical cover 23 and to which is attached bar indicator 25.

Disposed within the sump 12 is a suitable filter element having a previous core 57 surrounded by filtering material 59. The filtering element is equipped with suitable sealing means 61 and 63 at its upper and lower ends respectively. Sealing element 61 comes in contact with the lower ends of supporting means 35 and sealing element 63 contacts rib 17 projecting upwardly from the central portion of the base as mentioned hereinabove. Accordingly, the sump 12 is sealed in such a fashion that it forms a peripherally located entrance chamber and a centrally located exit chamber which are completely isolated from each other so long as the piston is in its uppermost position at which point the bar indicator will denote that the filter is clean, the linkage retaining the bar indicator over that area of the indicating surface which is labeled clean as seen in FIGURE 2.

In addition to the sealing means on the filter element already mentioned and which cooperate with the lower end of the support means and the upwardly projecting rib in the base member by which the filler element is supported and sealed, the internal surface of the sump 12 may also be equipped with a plurality of ribs around its internal circumferential surface. When so equipped the ribs aid in centering the filter cartridge as well as directing the flow of incoming fluid across the filtering surface of the filter element.

The supporting means 35 is also equipped with a plurality of ribs disposed around its internal circumferential surface and which are designated by numerals 65 and 67. These ribs function to prevent the piston from riding off center when it is in its lowermost position within the supporting means.

In operation the hydraulic filter cartridge of this invention operates in accordance with the following procedure. Fluid to be filtered is introduced through the inlet 13 and passes upwardly in the sump 12 across the face of the filtering element. At this time the piston is held in its upward position by a calibrated spring 47 which through the linkage locates a semi-circumferential indicating bar at that area of the indicating surface marked clean. Consequently, material is forced through the filtering material and through the previous core thereof after which it flows downwardly and out through outlet 15. As the filter element begins to get dirty, differential pressure builds up within the cartridge. When differential pressure has reached a point so that it overcomes the force of spring 47, piston 43 is forced downwardly along with rod 45 thereby causing the linkage at the upper end of the rod to move the indicating bar 25 over to the warning area on the indicating surface. As differential pressure continues to build up in the cartridge the piston moves even further downward until it reaches a point below the enlarged area of the supporting means and thereby permits communication between the peripheral chamber and the internal chamber of the cartridge. At this point the indicating bar will have moved across the indicating surface to indicate by-pass and fluid entering the cartridge passes upward to the top of the cartridge and down through the now exposed opening between the piston and the cylinder in which it rides and thence outwardly through the core of the filter to the outlet.

The filter cartridge of this invention has a housing which is preferably lightweight aluminum although it can be made of any suitable material. Moreover, if desirable an electric alarm switch might also be incorporated into the system. When so employed such a switch is mounted on the base of the filter and is operated by a hydraulic mechanism which senses differential pressure across the cartridge. Moreover, such an electric alarm switch can be employed to operate independently of the indicating mechanism described hereinabove. The setting of the electric alarm can be correlated with the indicating mechanism and cartridge by-pass setting described hereinbefore although both systems as mentioned will operate independently of each other.

Another optional indicating mechanism which might be employed on the hydraulic filter of this invention is a rod-type permanent magnet which can be installed inside the filter cartridge to monitor all hydraulic fluid passing through the cartridge core. The indicator heads need not be modified when this added safety feature is utilized. Furthermore, in view of the easily removable lock nut which permits removal of the indicating head and associated structure, the filter element can be readily exchanged and filter elements having varying filter rates and capacity can be exchanged one for the other when desirable. In addition, the housing or one-piece sump and base can be made in varying strengths in order to withstand different pressure conditions.

Numerous other advantages of this invention will be readily apparent to those skilled in the art. Accordingly it is to be understood that this invention is not to be limited in scope and that many modifications thereof may be made without departing from the spirit of the invention, except as it is defined in the appended claims.

What is claimed is:

1. A filter cartridge comprising a unitary base and sump, inlet means located in said base in communication with the peripheral portion of said sump, outlet means located in said base in communication with the central portion of said sump, a cover having indicating information means thereon located at the opposite end of said sump adapted to be supported by and sealingly engaged to said sump and including a supporting means, a piston disposed in said supporting means and fixed to a rod, a spring disposed around said rod and in contact with said piston urging the piston upwards, said spring being supported by a centrally projecting base on the supporting means, said rod at one end projecting downwardly through an opening in said centrally projecting base and at its opposite end connected to a linkage, said linkage actauting a bar indicator which is adapted to move relative to the exterior surface of said cover, a filter element disposed in said sump and dividing said sump into a peripherally located entrance chamber and a centrally located exit chamber, said filtering element being supported on a ridge disposed on said base member around the central outlet and at its opposite end supporting the lower extremities of the support means of said piston in a sealingly engaging relationship, said cover and associated structures being connected to said sump by locking means, said filter cartridge being responsive to changes in differential pressure which move said piston downwardly thereby permitting direct communication between the external chamber and the internal chamber in said sump and allowing liquid to pass through said cartridge without passing through said filter element while moving said indicating bar with respect to said indicating information on said cover.

2. A filter cartridge as defined in claim 1 wherein the supporting means has a plurality of ribs located on the internal circumferential surface thereof.

3. A filter cartridge as defined in claim 1 wherein the sump is provided with a plurality of ribs disposed along the internal circumferential surface thereof.

4. A filter cartridge comprising a unitary base and sump inlet means located in said base in communication with the peripheral portion of said sump, outlet means located in said base in communication with the central portion of said sump, a cover having indicating information means thereon located at the opposite end of said sump adapted to be supported by and sealingly engaged with said sump and including a supporting means, a piston disposed in said supporting means, said piston being fixed to a rod which projects above the upper level of said piston and below the lower extremity of said piston, a calibrated spring disposed around said rod and in contact with said piston, urging the piston upwards, said spring being supported by a centrally projecting base on said supporting means, said rod at its lowermost end projecting downwardly through an opening in said centrally projecting base, the upward movement of said rod being limited by locking means disposed thereon on that portion of the rod projecting through the lower portion of said centrally projecting base and at its upper end connected to a linkage, said linkage being connected to a rod projecting through openings in said cover and cooperating with a bar indicator which is adapted to move relative to the exterior surface of said surface, a filter element disposed in said sump and dividing said sump into a peripherally located entrance chamber and a centrally located exit chamber, said filtering element having sealing rings disposed on each end, the lower end of said filter element being sealingly supported on a ridge disposed on said base member around the central outlet and at its upper end sealingly supported through said sealing ring and disposed thereon the lower extremities of the support means of said piston, said cover and associated structure being connected to said sump by locking means, said filter cartridge being responsive to changes in differential pressure which move said piston downwardly thereby permitting direct communication between the external chamber and the internal chamber in said sump and allowing liquid to pass through said cartridge without passing through said filter element while causing movement through said linkage of said indicator bar with respect to said indicating information on said cover.

5. A filter cartridge as defined in claim 4 wherein the cover is dome-shaped.

6. A filter cartridge as defined in claim 4 wherein the locking means for locking said cover and associated structure to said sump is a threaded lock nut having central opening and the central portion of said cover projects upwardly through the central opening of said lock nut.

References Cited

UNITED STATES PATENTS

| | | | |
|---|---|---|---|
| 2,729,339 | 1/1956 | McCoy | 210—90 |
| 3,348,684 | 10/1967 | Wilber | 210—90 |
| 3,374,890 | 3/1968 | Kudlaty | 210—90 |

SAMIH N. ZAHARNA, Primary Examiner

U.S. Cl. X.R.

210—130, 440